Oct. 28, 1952 C. W. HANSELL 2,615,991

SOUND REPRODUCING METHOD AND SYSTEM

Filed June 11, 1948 2 SHEETS—SHEET 1

INVENTOR.
Clarence W. Hansell
BY Ival R. Gosham
ATTORNEY.

Oct. 28, 1952 C. W. HANSELL 2,615,991

SOUND REPRODUCING METHOD AND SYSTEM

Filed June 11, 1948 2 SHEETS—SHEET 2

INVENTOR.
Clarence W. Hansell
BY
ATTORNEY.

Patented Oct. 28, 1952 2,615,991

UNITED STATES PATENT OFFICE 2,615,991

SOUND REPRODUCING METHOD AND SYSTEM

Clarence W. Hansell, Port Jefferson, N. Y., assignor to Radio Corporation of America, a corporation of Delaware Application June 11, 1948, Serial No. 32,285

8 Claims. (Cl. 179—100.3)

This invention relates to sound record reproduction methods and systems, and relates particularly to a type of noiseless or anti-ground noise sound record reproduction whereby imperfections in the record are prevented from contributing noise to the finally reproduced sound.

Several types or forms of anti-ground noise sound recording and reproducing systems are known. The usual form applied to variable density records varies the average density of the record in accordance with the envelope of the sound amplitude, while, for variable area records, the amount of opaque area varies in accordance with the envelope of the amplitude of the sound being recorded. By these expedients, it is possible to keep the total current in a photocell responsive to the record relatively small and to have this current nearly 100% modulated. Then there is little extra photocell current to contribute to the noise level.

A type of noiseless sound reproducing system which can be used with a variable area record, whether or not the above noise reducing feature has been applied, is disclosed and claimed in Cooney U. S. Patent No. 2,347,084 of April 18, 1944. In this system, a small scanning spot of light is made to sweep across the opaque and transparent areas of a sound record very rapidly at right angles to the sound track as the sound record is advanced, and then limiting is applied in electrical circuits responsive to the light passed by the sound record, so that the effect of any moderate variations in the light beam caused, for example, by specks of dirt in transparent areas, and by scratches in opaque areas, are eliminated from the final reproduction of the recorded sound. The efficiency of such a system is low, and it requires some form of scanning arrangement. Cooney disclosed a mechanically rotating mirror scanner. There is also a large loss in sensitivity in that only a small part of the sound track is utilized at any one time because the flying light spot cannot cover more than a small fraction of the width of a sound track at any one time in order to effect efficient thresholding. This may, in some cases, so reduce the electrical response to the record as to allow thermal agitation and tube noise to become apparent in the reproduced sound.

The present invention is directed to a method of and system for reproducing a variable area type of sound record in which the usual type of noise reduction has or has not been applied, and which provides limiting of a novel type. Both thresholding and limiting may be applied simultaneously over the entire width of the sound track area so that, in effect, a response to all elemental areas along a scanning line at right angles to the direction of motion of the sound record will be subject to thresholding and limiting. In this manner, the length of time during which each elemental area is exposed to light may be much greater than it is when flying light spot scanning is used. This results in an increase in sensitivity or amplification.

The fact that each elemental area can be utilized for a longer time reduces the noise effects in the scanning system, suppression of which would otherwise require an extremely intense light source. It is well-known that the response of a scanning system to a signal, as compared to noise produced by shot effect, flicker effect, and thermal agitation in photocells and circuit, improves as the amount of light passed per elemental area of the sound track area is increased.

To accomplish thresholding and limiting throughout the whole length of a line of light, I employ a type of photocell or photocell-amplifier in which there is substantially no response or electrical current to increasing light intensity at any point until the intensity is greater than a predetermined thresholding value. However, once the threshold value of light at any point is exceeded by a substantial percentage, then maximum electrical response will be obtained, and any further increase in light intensity will produce no additional electrical current response. In other words, the electrical response of the scanning system to each elemental area along the line of light scanning the film will be, for all practical purposes, either zero or maximum, with a relatively sharp transition from one condition to the other at a predetermined light intensity.

The principal object of the invention, therefore, is to facilitate the noiseless reproduction of sound from imperfect sound records.

Another object of the invention is to provide an improved system for reproducing sound without noise from a sound record to which ground noise reduction has not been applied.

A further object of the invention is to provide an improved scanning system for a sound record which has intrinsic thresholding and limiting.

A still further object of the invention is to provide an improved system for scanning the entire width of a sound track area having intrinsic thresholding and limiting.

Although the novel features which are believed to be characteristic of this invention will be pointed out with particularity in the appended claims, the manner of its organization and the mode of its operation will be better understood by referring to the following description read in conjunction with the accompanying drawings, forming a part hereof, in which:

Figure 5:
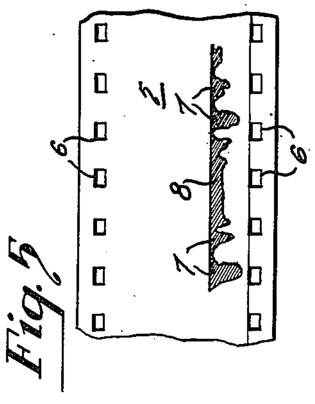
Fig. 5 is a view of a section of a sound film which may be reproduced with the invention without noise.

Referring now to the drawings, in which the same numerals identify like elements, and particularly referring to Fig. 5, a section of a simple unilateral variable area sound track on a motion picture film 5 having perforations 6 is shown with modulations 7 and an unmodulated section 8. It will be noted that during periods of no-signal, approximately fifty percent of the track width is opaque and the other fifty percent is transparent. This is also true during modulations, but at this time, the signal level is high providing a high signal to noise ratio. It is realized that any specks of dirt on the transparent area will cause unwanted variations in a light beam passing therethrough, while scratches, abrasions, etc., in the opaque portion cause unwanted light to pass to the pickup cell and cause variations in the output current thereof. The present invention eliminates these variations.

Figure 6:
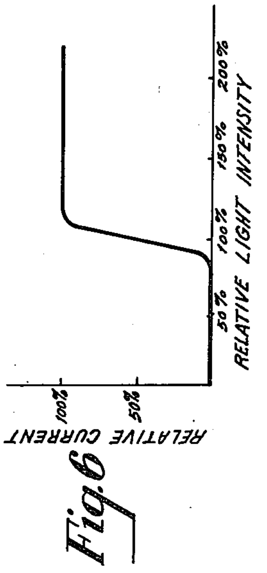
Fig. 6 is a graph illustrating the variation in current with variation in light intensity from each elemental area of the sound track as it is scanned to reproduce recorded sound.

Fig. 6 illustrates the response desired to light intensity from each elemental area of the sound track in order that the effect of dirt, scratches, and other imperfections may be eliminated from the reproduced sound. In opaque or black areas of the track where there may be scratches or blemishes, no output current should result for any amount of light up close to the 100% threshold value. Likewise, in the transparent or white areas, no current variation results unless dirt or other blemishes modulates the light intensity down close to the 100% thresholding and limiting value.

Figure 1:
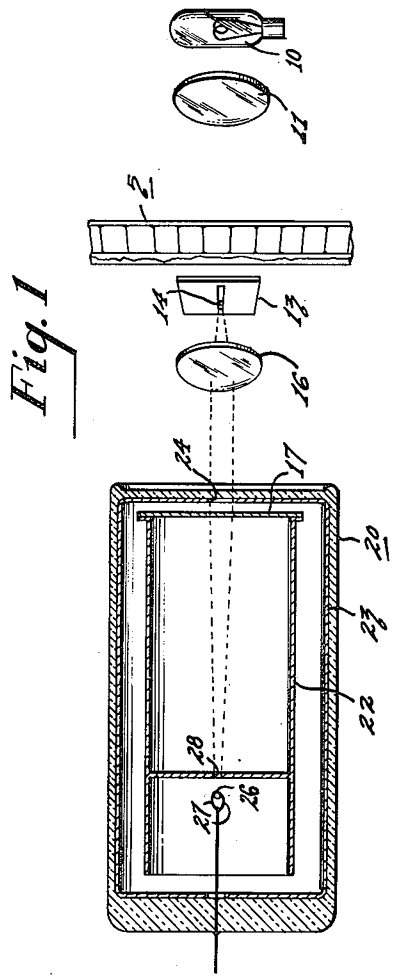
Fig. 1 is an elevational view of the essential elements of one modification of the invention.
Figure 2:
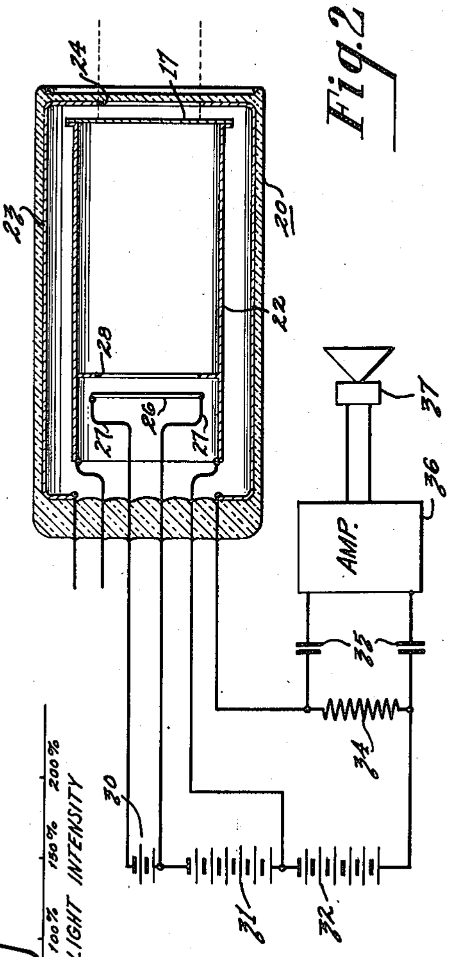
Fig. 2 is a plan view of the scanning tube of Fig. 1 and includes the output circuit.

In Figs. 1 and 2, light from a light source, such as a lamp 10, is projected by a lens 11 to the film 5 and through the sound track portion thereof to a slit mask 13 having a slit 14 therein. The emergent light from the slit is projected by a lens 16 to a very thin semi-insulating screen 17 of a scanning tube 20. The screen 17 may be made by blowing out glass to an extreme thinness and catching a portion of the thin glass on the end of a metal tube, removing the blowing pressure, and allowing the portion of the glass bubble to cool as an extremely thin sheet of plane glass. The side of the glass toward the film is then provided with a very thin, highly insulating layer, or mosaic, which is photo-emissive. Such a mosaic may be made by evaporating a very thin silver coating onto the glass and then heating it for a time, which causes many very small insulated silver droplets, after which the droplets are partially oxidized and activated with cesium vapor. Other materials may also be used in making screens with similar characteristics. For art on this subject, reference may be made to numerous publications relating to iconoscopes or television camera tubes. Thus, each pair of elemental areas on each side of the thin layer of glass form an equivalent electrical condenser with electrical leakage through the glass proportional to the area, and any designated portion of the glass film has a definite electrical discharge time constant. This time constant is made short enough, by adjusting the resistivity of the glass assuming a given thickness, so that retention of the charge on the elemental areas will not interfere with the reproduction of sound up to the highest required audio frequencies. There are numerous ways of adjusting the glass resistivity by inclusion of impurities. One method is simply to heat the glass to a temperature and for a time, determined empirically, in vacuum or in hydrogen, to remove some of the oxygen from the glass, leaving an excess of metal.

The plate 17 is mounted on a metallic shield 22, while, surrounding the shield 22 and extending over the front of plate 17, is an anode cylinder 23 with an opening 24 therein sufficient to permit the light beam from the slit 14 to pass to the plate 17. An elongated cathode 26 is provided having shield wires 27 and is positioned behind a beam forming opening 28. The cathode is heated by a source of potential such as shown at 30, a potential being provided for the shield 22 by a potential source 31, and for the anode 23, by a potential source 32. The output circuit is connected between anode 23 and shield 22 across a loading resistor 34 connected over condensers 35 to an audio amplifier 36 feeding a loudspeaker 37.

Referring now to the operation of the device, the back side of the thin glass screen is subjected to a spray of electrons from the thermionic cathode 26 which continues until the potential of the screen has become equal to or somewhat more negative than, the potential of the cathode. Once the potential is this low on any elemental area, approaching electrons from the cathode are reflected back from the screen and are caught on the metal cylinder or shield 22 on which the screen is mounted. In the absence of photo-emission from the front surface of the screen, the flow of electrons to the screen remains zero for all practical purposes.

Now, if light shines through the transparent portion of a sound film record 5 onto a portion of the front surface of the screen, then electrons will be emitted from the front surface to conducting anode 23. If the intensity of the light is first made small, and is then increased, the corresponding electron emission will increase in density almost in direct proportion, up to the maximum density of electrons available from the cathode 26. However, once the photo-emission per elemental area exceeds the maximum electron current to the back side of the screen, any further increase in light intensity can cause no further increase in photo-emission. Instead, the elemental area of the screen thereafter automatically changes its potential to keep electron input to the back and electron output from the front balanced at the limited value to the back.

Therefore, the maximum electron density available to the back of the screen is set far above the photo-emission caused in areas covered by the opaque portions of the sound track, but far below the photo-emission, in the absence of limiting, which could be caused by light through transparent areas of the sound track. Thus, modulations of the light due to dirt, scratches, and other imperfections in either the opaque or transparent areas of the sound track cause relatively little change in total photo-emissive current from the screen, and consequently, these imperfections do not cause noise in the output circuit, which is actuated by the total electron emission current from the screen 17. In effect, every elemental area of the screen upon which the light can shine has its own limiting, and the flow of total electron current is then much more nearly proportional to the transparent area of the sound track than it is in the present type of reproducing system where no noise limiting is provided.

Figure 3:
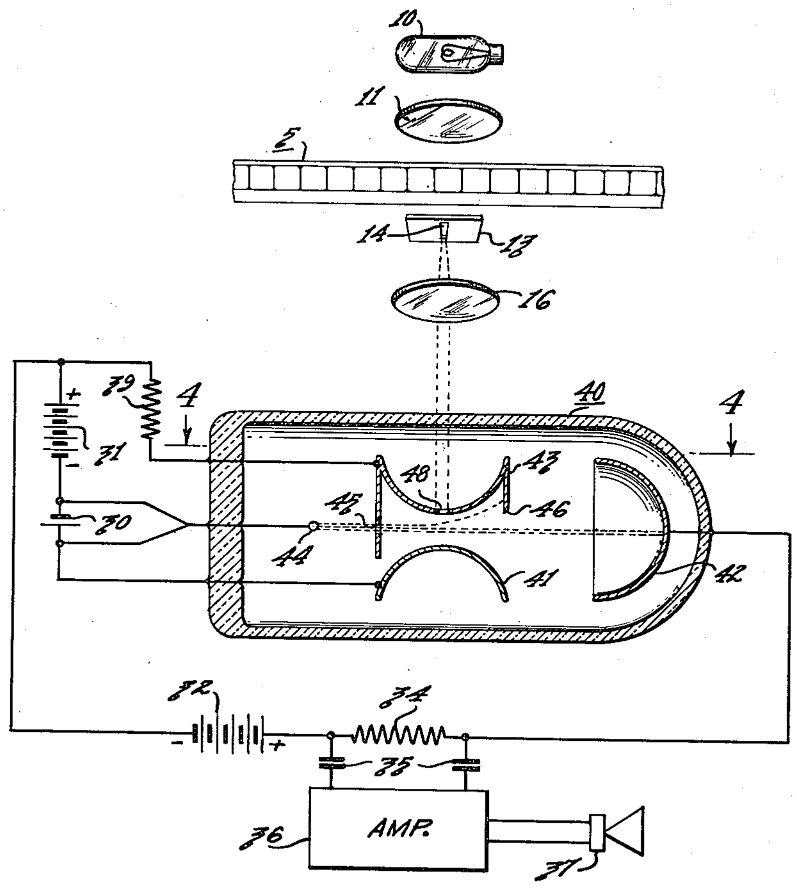
Fig. 3 is an elevational view of a second modification of the invention.
Figure 4:
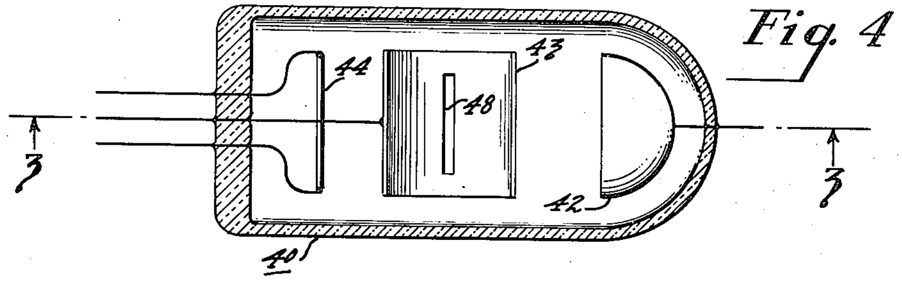
Fig. 4 is a plan view of the scanning tube of Fig. 3.

Referring now to Figs. 3 and 4, a system is shown in which both thresholding and limiting of the electron current is produced in response to each elemental area of the sound track. In this modification, a photocell 40 has a curved electrode 41, an anode 42, and a knife edge electrode 43, a cathode 44, and an electron beam forming aperture 45. Electrode 43 is formed by bending a flat rectangular strip into flat and cylindrical portions, while electrode 41 is part of a cylinder. A negative feedback resistor 39 is provided to improve the linearity of the response. On the electrode 41 is a photo-emissive surface on a resistive layer on the metal electrode, the potential of the elemental areas thereof being controlled by the photo-emissive density to vary the deflection of the elemental portions of the electron beam from the cathode 44. The cylindrical portion of electrode 43 has a slot 48 therein to pass light to electrode 41 and is at a positive potential with respect to the cathode to form an electron beam in the form of a very thin ribbon of moving electronic space charge, which is passed between electrodes 41 and 43, the electrode 43 being at the same potential as the beam forming slot. The surface of electrode 41 is photo-emissive and discontinuous enough so that there is a very high resistance along the surface, the surface being separated from the metal electrode on which it is mounted by a very thin layer of insulating material having resistive leakage such that the capacity resistance relation of each elemental portion of the surface to the supporting metal electrode gives a time constant preferably shorter than the time of a half cycle of the highest audio frequency to be reproduced. A somewhat longer time constant may be used provided that the resulting modification of the frequency response characteristics of the system is equalized in the audio output circuits. By this means, the effects of noise produced in the photocell itself may be somewhat further reduced.

In operation, if the surface on electrode 41 is scanned by light through the sound track on film 5, then the distribution of the potential of the illuminated area will be controlled in accordance with the distribution of light intensity, each elemental area becoming more positive with increasing light intensity. This, in turn, will vary the deflection of various portions of the moving beam or ribbon of electrons from cathode 44, as shown by the dotted lines. By causing various portions of the ribbon of electrons to be deflected, or not deflected, as the case may be, past the knife edge 46, an abrupt change in the destination of each portion of the ribbon beam is caused. Now, if the light intensity is less than some arbitrary or fixed thresholding value on any elemental area of the surface of electrode 41, then the corresponding portion of the ribbon will be caught by electrode 46. However, if the light intensity is greater than the threshold value, then the portion of the beam will be deflected past the knife edge and go to electrode 42. Thus, to a very large degree, each elemental portion of the photocell has thresholding. Limiting is, of course, also provided by the fixed intensity of the electron beam as in Figs. 1 and 2, and, therefore, both thresholding and limiting for all elemental areas of the sound track are provided. Consequently, imperfections in the film such as dirt, scratches, etc., do not cause output noise as they do in the standard type of photocell reproducing system.

While I have described my thresholding and limiting photocell in association with a sound track of the kind, in which, during reproduction of the sound, light is passed through a transparent supporting film, it will, of course, be apparent that the photocell will work equally well when light is reflected from the surface of a sound track laid on opaque material.

I claim:

1. A sound reproducing system for eliminating ground noise from the reproduced sound, comprising a photo-emissive electrode, a sound record having substantially transparent and opaque areas transversely of the record, means for moving said record, means for projecting light as a narrow beam extending across the width of said record to one side of said electrode, a source of electrons, means for forming said electrons into a ribbon beam corresponding in length to the maximum length of said light beam for projection on the opposite side of said photo-emissive electrode, and means for transforming the electrons released from said surface by the variations in transparent and opaque areas of said record into electrical currents as said record is moved by said record moving means.

2. A sound reproducing system in accordance with claim 1, in which means are provided for setting the electron density to said electrode above the photo-emission density from portions of said photo-emissive surface covered by said opaque areas and below the photo-emission density from portions of said surface covered by said transparent areas.

3. A sound reproducing system in accordance with claim 1, in which a second electrode is provided for intercepting said electrons which are released from the portion of the photo-emissive surface covered by light passing through said transparent areas.

4. A noise reducing sound reproducing system for a sound track having varying opaque and substantially transparent areas transversely of the sound track comprising means for obtaining a narrow beam of light from said sound track, said beam varying in length with the modulations of said track, a cathode ray tube having a photo-emissive electrode adapted to receive said narrow beam of light on one side and a correspondingly sized ribbon of electrons on the other side, and an anode for collecting electrons from the portions of said surface impressed with light through the transparent areas of said sound track.

5. A noise reducing sound reproducing system in accordance with claim 4, in which means are provided for setting the electron density to said electrode above the photo-emission density from portions of said photo-emissive surface covered by said opaque areas and below the photo-emission density from portions of said surface covered by said transparent areas.

6. A sound track reproducing system for eliminating ground noise from the reproduced sound, comprising means for obtaining a narrow beam of light from said sound track, a cathode ray tube having a cathode, anode, and photo-emissive surface, means for projecting said narrow beam of light on said surface, and an electron intercepting electrode between said cathode of said cathode ray tube and said anode for receiving electrons deflected by positive charges on said photo-emissive surface.

7. In the noiseless reproduction of recorded sound, by causing a sound track to modulate the length of a beam of light, the combination of a photo-emissive surface, means for projecting a narrow beam of light extending across the width of said track and varying in length in accordance with the width of said track, means for producing electron photo-emission from said surface when illuminated by said light, means for translating said photo-emission into corresponding electrical currents, and means for applying thresholding and limiting to said electron current from each elemental area of said surface, said means producing substantially no variations in electron currents caused by variations in said light less than a predetermined value.

8. In a noiseless sound record reproducing system, the combination of a cathode ray tube with an electrode having a photo-emissive surface on one side thereof, means for projecting a narrow beam of light extending across the width of a sound record area to said surface, means for generating a narrow beam of electrons corresponding in size to said light beam, means for impressing said narrow beam of electrons on the other side of said photo-emissive surface, means for varying said electron beam in accordance with the electron emission from said surface caused by variations of said light beam, and means for translating said variations in said electron beam into corresponding electrical currents.

CLARENCE W. HANSELL.

REFERENCES CITED

The following references are of record in the file of this patent:

UNITED STATES PATENTS

| Number | Name | Date |
|---|---|---|
| 2,176,225 | Ogloblinsky | Oct. 17, 1939 |
| 2,300,591 | Osawa | Nov. 3, 1942 |
| 2,347,084 | Cooney | Apr. 18, 1944 |
| 2,363,502 | Collins | Nov. 28, 1944 |

FOREIGN PATENTS

| Number | Country | Date |
|---|---|---|
| 232,941 | Switzerland | June 30, 1944 |
| 381,573 | Great Britain | Oct. 4, 1932 |